US 11,965,903 B2

(12) United States Patent
Kojima et al.

(10) Patent No.: US 11,965,903 B2
(45) Date of Patent: Apr. 23, 2024

(54) AUTOMATED ANALYZER AND METHOD OF CONTROLLING AUTOMATED ANALYZER

(71) Applicant: JEOL Ltd., Tokyo (JP)

(72) Inventors: Kazushige Kojima, Tokyo (JP); Yoshiyuki Nakayama, Tokyo (JP); Masato Nakayama, Tokyo (JP); Arihiro Toyoda, Tokyo (JP); Hiroo Sugimura, Tokyo (JP); Yuta Ikarashi, Tokyo (JP); Yasuhiro Fukumoto, Tokyo (JP); Makoto Asakura, Tokyo (JP)

(73) Assignee: JEOL Ltd., Tokyo (JP)

( * ) Notice: Subject to any disclaimer, the term of this patent is extended or adjusted under 35 U.S.C. 154(b) by 427 days.

(21) Appl. No.: 16/886,013

(22) Filed: May 28, 2020

(65) Prior Publication Data
US 2020/0378996 A1 Dec. 3, 2020

(30) Foreign Application Priority Data
May 31, 2019 (JP) .................. 2019-102472

(51) Int. Cl.
G01N 35/10 (2006.01)
(52) U.S. Cl.
CPC ..... *G01N 35/1011* (2013.01); *G01N 35/1002* (2013.01); *G01N 35/1004* (2013.01)
(58) Field of Classification Search
CPC .......... G01N 35/1011; G01N 35/1002; G01N 35/1004; G01N 35/04; G01N 2035/00534; G01N 2035/0437
See application file for complete search history.

(56) References Cited

U.S. PATENT DOCUMENTS

2002/0064481 A1* 5/2002 Ishizawa ............ G01N 35/1011
422/511
2012/0318302 A1* 12/2012 Nakayama ......... G01N 35/1004
134/26
(Continued)

FOREIGN PATENT DOCUMENTS

EP 0289789 A1 * 11/1988 ............. G01N 35/06
EP 0411620 A2 2/1991
(Continued)

OTHER PUBLICATIONS

Extended European Search Report issued in EP20177139.1 dated Oct. 22, 2020.
Office Action issued in JP2019-102472 dated Aug. 3, 2021.

*Primary Examiner* — Benjamin R Whatley
*Assistant Examiner* — Curtis A Thompson
(74) *Attorney, Agent, or Firm* — The Webb Law Firm

(57) ABSTRACT

An automated analyzer includes a reagent dispensing probe that dispenses a reagent to a reaction vessel, a sample dispensing probe that dispenses a sample to the reaction vessel, a stirring rod that stirs a sample and a reagent in the reaction vessel, and a storage unit that stores special washing information including information about a condition for performing special washing to prevent sample carryover and a washing method. The automated analyzer further includes: a determination unit that determines whether the special washing is required based on information about the sample dispensed by the sample dispensing probe and the special washing information; and a controller that causes the reagent dispensing probe to dispense a wash liquid to the reaction vessel and causes the stirring rod to stir the wash liquid in the reaction vessel based on the special washing information, when the special washing is performed.

6 Claims, 7 Drawing Sheets

(56) References Cited

U.S. PATENT DOCUMENTS

| | | | |
|---|---|---|---|
| 2015/0153370 A1* | 6/2015 | Saito | G01N 35/1004 |
| | | | 422/63 |
| 2015/0219679 A1* | 8/2015 | Takeuchi | G01N 33/5302 |
| | | | 422/64 |
| 2016/0187365 A1 | 6/2016 | Yaita | |
| 2017/0176484 A1* | 6/2017 | Muramatsu | G01N 35/1079 |
| 2018/0348246 A1 | 12/2018 | Asakura | |

FOREIGN PATENT DOCUMENTS

| | | | | |
|---|---|---|---|---|
| JP | H3-65654 A | | 3/1991 | |
| JP | H3-115866 A | | 5/1991 | |
| JP | 2005201771 A | | 7/2005 | |
| JP | 2007047027 A | * | 2/2007 | ............ G01N 35/00 |
| JP | 2009288052 A | * | 12/2009 | |
| JP | 2013148516 A | * | 8/2013 | |
| JP | 2014206380 A | * | 10/2014 | ............ G01N 35/02 |
| JP | 2015230205 A | * | 12/2015 | |
| JP | 201817676 A | | 2/2018 | |

\* cited by examiner

| NUM-BER | CARRYOVER ANALYTE | PREVENTIVE DETERGENT OPTION |
|---|---|---|
| 1 | 1. HCV ▼ | 18. DETERGENT A ▼ |
| 2 | 2. SYPHILIS TP ▼ | 19. DETERGENT B ▼ |
| 3 | 3. SYPHILIS RP ▼ | 19. DETERGENT B ▼ |
| 4 | ▼ | ▼ |
| 5 | ▼ | ▼ |
| 6 | ▼ | ▼ |
| 7 | ▼ | ▼ |
| 8 | ▼ | ▼ |
| 9 | ▼ | ▼ |
| 10 | ▼ | ▼ |

FIG. 4

AUTOMATED ANALYZER AND METHOD OF CONTROLLING AUTOMATED ANALYZER

CROSS-REFERENCE TO RELATED APPLICATION

This application claims priority to Japanese Patent Application No. 2019-102472 filed May 31, 2019, the disclosure of which is hereby incorporated by reference in its entirety.

BACKGROUND OF THE INVENTION

Field of the Invention

The present invention relates to an automated analyzer and a method of controlling the automated analyzer.

Description of Related Art

In some known automated biochemical analyzers, sample dispensing probes that dispense samples and diluting/stirring rods that stir diluted samples are washed using an alkaline detergent (special washing) to avoid sample carryover (for example, JP-A-2018-17676).

While the units that come into direct contact with samples (sample dispensing probe and diluting/stirring rod) undergo special washing in the existing automated analyzer, no special washing is performed for reagent dispensing probes or reaction liquid stirring rods that come into indirect contact with samples, because of which it was not possible to prevent sample carryover via the reagent dispensing probes or stirring rods depending on the concentration of a strongly positive sample analyzed immediately before.

SUMMARY OF THE INVENTION

The invention can provide an automated analyzer and a method of controlling the automated analyzer that allow for prevention of sample carryover via a reagent dispensing probe or stirring rod.

According to a first aspect of the invention, there is provided an automated analyzer that includes a reagent dispensing probe that dispenses a reagent to a reaction vessel, a sample dispensing probe that dispenses a sample to the reaction vessel, a stirring rod that stirs a sample and a reagent in the reaction vessel, and a storage unit that stores special washing information including information about a condition for performing special washing to prevent sample carryover and a washing method, the automated analyzer including:
a determination unit that determines whether or not the special washing is required based on information about a sample dispensed by the sample dispensing probe and the special washing information; and
a controller that controls operations of the reagent dispensing probe, the sample dispensing probe, and the stirring rod, and
the controller causing the reagent dispensing probe to dispense a wash liquid to the reaction vessel and causing the stirring rod to stir the wash liquid in the reaction vessel based on the special washing information, when the special washing is performed.

According to a second aspect of the invention, there is provided a method of controlling an automated analyzer that includes a reagent dispensing probe that dispenses a reagent to a reaction vessel, a sample dispensing probe that dispenses a sample to the reaction vessel, a stirring rod that stirs a sample and a reagent in the reaction vessel, and a storage unit that stores special washing information including information about a condition for performing special washing to prevent sample carryover and a washing method, the method including:
a determination step of determining whether or not the special washing is required based on information about a sample dispensed by the sample dispensing probe and the special washing information; and
a control step of controlling operations of the reagent dispensing probe, the sample dispensing probe, and the stirring rod, and
the control step including causing the reagent dispensing probe to dispense a wash liquid to the reaction vessel and causing the stirring rod to stir the wash liquid in the reaction vessel based on the special washing information, when the special washing is performed.

BRIEF DESCRIPTION OF THE DRAWINGS

FIG. 4 is a diagram illustrating a carryover analyte setting screen displayed when analyte-specific wash mode is selected.

Figure 1:
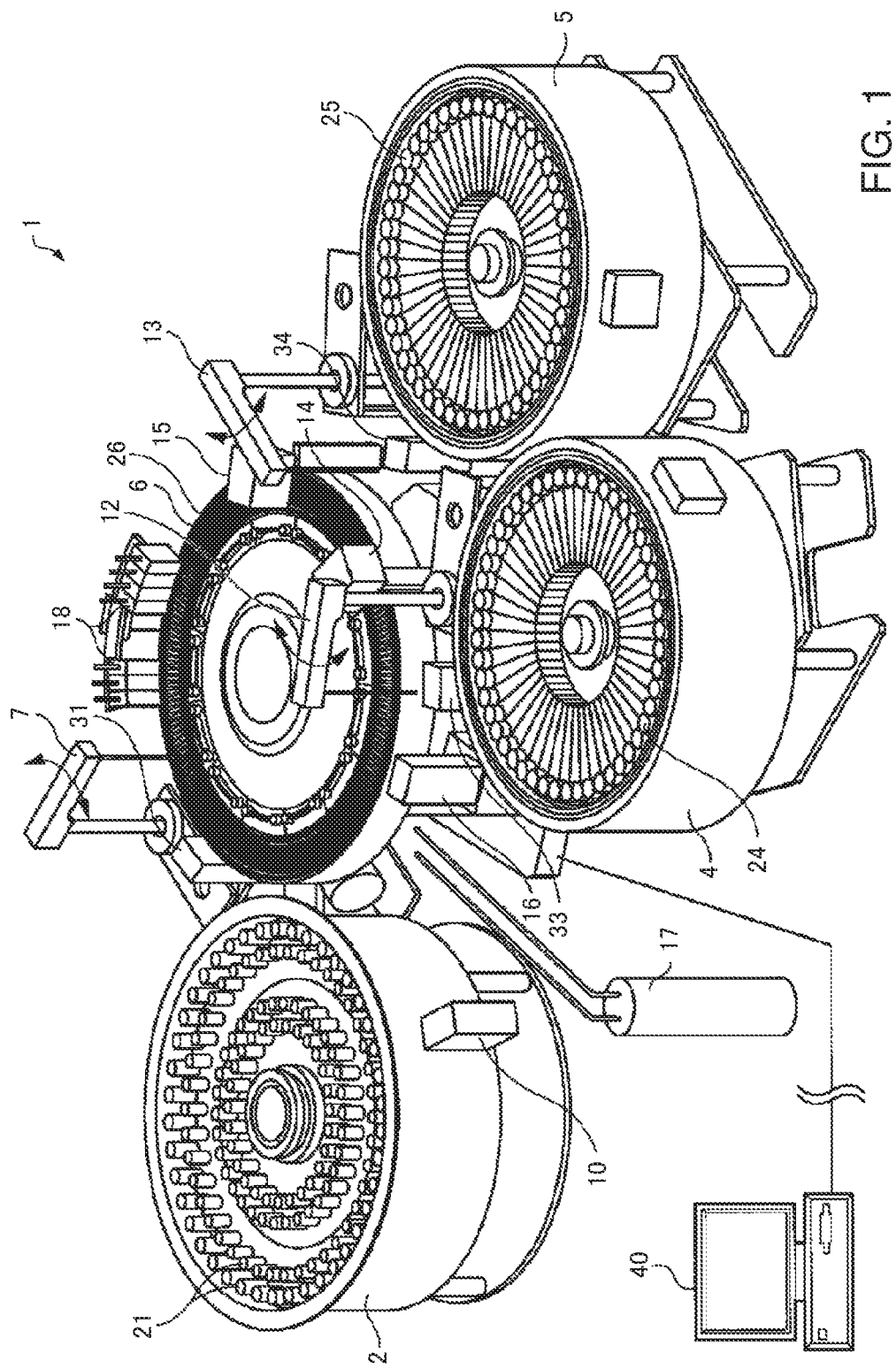
FIG. 1 is a schematic diagram illustrating one example of the configuration of an automated analyzer according to the first embodiment.

DESCRIPTION OF THE INVENTION (1) According to one embodiment of the invention, there is provided an automated analyzer that includes a reagent dispensing probe that dispenses a reagent to a reaction vessel, a sample dispensing probe that dispenses a sample to the reaction vessel, a stirring rod that stirs a sample and a reagent in the reaction vessel, and a storage unit that stores special washing information including information about a condition for performing special washing to prevent sample carryover and a washing method, the automated analyzer including:
a determination unit that determines whether or not the special washing is required based on information about a sample dispensed by the sample dispensing probe and the special washing information; and
a controller that controls operations of the reagent dispensing probe, the sample dispensing probe, and the stirring rod, and
the controller causing the reagent dispensing probe to dispense a wash liquid to the reaction vessel and causing the stirring rod to stir the wash liquid in the reaction vessel based on the special washing information, when the special washing is performed.

According to one embodiment of the invention, there is provided a method of controlling an automated analyzer that includes a reagent dispensing probe that dispenses a reagent to a reaction vessel, a sample dispensing probe that dispenses a sample to the reaction vessel, a stirring rod that stirs a sample and a reagent in the reaction vessel, and a storage unit that stores special washing information including information about a condition for performing special washing to prevent sample carryover and a washing method, the method including:
a determination step of determining whether or not the special washing is required based on information about a sample dispensed by the sample dispensing probe and the special washing information; and
a control step of controlling operations of the reagent dispensing probe, the sample dispensing probe, and the stirring rod, and
the control step including causing the reagent dispensing probe to dispense a wash liquid to the reaction vessel and causing the stirring rod to stir the wash liquid in the reaction vessel based on the special washing information, when the special washing is performed.

According to the automated analyzer and the method of controlling an automated analyzer described above, special washing of the reagent dispensing probe can be performed by causing the reagent dispensing probe to dispense a wash liquid to the reaction vessel, and special washing of the stirring rod can be performed by causing the stirring rod to stir the wash liquid in the reaction vessel, so that sample carryover via the reagent dispensing probe or stirring rod can be prevented.

(2) In the automated analyzer,
the controller may cause the sample dispensing probe to aspirate a wash liquid in the reaction vessel and to discharge the aspirated wash liquid into a wash chamber of the sample dispensing probe.

In the method of controlling an automated analyzer,
the control step may include causing the sample dispensing probe to aspirate a wash liquid in the reaction vessel and to discharge the aspirated wash liquid into a wash chamber of the sample dispensing probe.

According to the automated analyzer and the method of controlling the automated analyzer described above, the wash liquid is dispensed to the reaction vessel by the reagent dispensing probe, and special washing of the sample dispensing probe is performed using this wash liquid. Since the sample dispensing probe does not contact the fluid in the wash liquid source, contamination of the fluid in the wash liquid source can be prevented.

(3) In the automated analyzer,
based on a volume of a wash liquid dispensed to the reaction vessel, the controller may determine a descending amount of the sample dispensing probe relative to the reaction vessel when the sample dispensing probe aspirates the wash liquid in the reaction vessel.

In the method of controlling the automated analyzer,
based on a volume of a wash liquid dispensed to the reaction vessel, the control step may include determining a descending amount of the sample dispensing probe relative to the reaction vessel when the sample dispensing probe aspirates the wash liquid in the reaction vessel.

According to the automated analyzer and the method of controlling the automated analyzer described above, it is possible to prevent residual wash liquid on the exterior of the sample dispensing probe from being carried over to a subsequently dispensed sample by limiting the extent to which the sample dispensing probe is immersed in the wash liquid.

(4) In the automated analyzer,
the reagent dispensing probe may include a first reagent dispensing probe that dispenses a first reagent to the reaction vessel and a second reagent dispensing probe that dispenses a second reagent to the reaction vessel,
the stirring rod may include a first stirring rod that stirs a sample and a first reagent in the reaction vessel and a second stirring rod that stirs a sample, the first reagent, and the second reagent in the reaction vessel, and
the controller may cause the first stirring rod to stir a wash liquid dispensed to the reaction vessel by the first reagent dispensing probe, and may cause the second stirring rod to stir a wash liquid additionally dispensed to the reaction vessel by the second reagent dispensing probe.

In the method of controlling the automated analyzer,
the reagent dispensing probe of the automated analyzer may include a first reagent dispensing probe that dispenses a first reagent to the reaction vessel and a second reagent dispensing probe that dispenses a second reagent to the reaction vessel,
the stirring rod of the automated analyzer may include a first stirring rod that stirs a sample and the first reagent in the reaction vessel and a second stirring rod that stirs a sample, the first reagent, and the second reagent in the reaction vessel, and
the control step may include causing the first stirring rod to stir a wash liquid dispensed to the reaction vessel by the first reagent dispensing probe, and causing the second stirring rod to stir a wash liquid additionally dispensed to the reaction vessel by the second reagent dispensing probe.

According to the automated analyzer and the method of controlling the automated analyzer described above, sample carryover via the first stirring rod or second stirring rod can be prevented. Moreover, since the second stirring rod stirs the wash liquid additionally dispensed by the second reagent dispensing probe, the special washing of the second stirring rod can be carried out with purer wash liquid.

Embodiments of the invention are described in detail below with reference to the drawings. It is noted that the following embodiments do not unduly limit the scope of the invention as stated in the claims. In addition, all of the elements described below are not necessarily essential requirements of the invention.

1. First Embodiment

FIG. 1 is a schematic diagram illustrating one example of the configuration of an automated analyzer according to a first embodiment. The automated analyzer 1 is an automated biochemical analyzer that automatically measures the amount of a specified constituent contained in a sample such as blood or urine collected from a living body.

The automated analyzer 1 illustrated in FIG. 1 includes a sample turntable 2, a first turntable 4, a second turntable 5, a reaction turntable 6, a sample dispensing probe 7, a sample bar code reader 10, a first reagent dispensing probe 12, a second reagent dispensing probe 13, a first reaction liquid stirring system 14, a second reaction liquid stirring system 15, a multiwave photometer 16, a constant temperature bath 17, a reaction vessel wash system 18, a sample dispensing probe wash system 31, a first reagent dispensing probe wash system 33, a second reagent dispensing probe wash system 34, and a controller 40. The automated analyzer 1 performs a unit of repeated operations, for example, sample- or reagent-dispensing operations by various probes such as the sample dispensing probe 7 and first reagent dispensing probe 12, or stirring operations by the first reaction liquid stirring system 14 and second reaction liquid stirring system 15, over a one-cycle period.

The sample turntable 2, first turntable 4, second turntable 5, and reaction turntable 6 are rotatably supported by drive systems (not shown) to rotate along the circumferential direction at a predetermined speed in each predetermined angular range along the circumferential direction.

The sample turntable 2 holds a plurality of sample containers 21. The sample containers 21 each contain a sample such as blood or urine.

The first turntable 4 holds a plurality of first reagent containers 24, and the second turntable 5 holds a plurality of second reagent containers 25. The first reagent containers 24 contain a first reagent, and the second reagent containers 25 contain a second reagent. The first reagent container 24 and second reagent container 25 may collectively be referred to simply as "reagent container". Some of the reagent containers contain a wash liquid (e.g., an alkaline detergent containing a surfactant) used for the special washing to be described later.

The reaction turntable 6 holds a plurality of reaction vessels 26. The plurality of reaction vessels 26 are circumferentially arranged and accommodated on the reaction turntable 6, and the reaction turntable 6 transfers the reaction vessels 26 intermittently in the circumferential direction. A sample taken from a sample container 21, a first reagent taken from a first reagent container 24, and a second reagent taken from a second reagent container 25 are injected into a reaction vessel 26. The sample, first reagent, and second reagent are stirred in the reaction vessel 26 so that a reaction takes place.

The sample dispensing probe 7 aspirates a predetermined volume of sample from a sample container 21 transferred to a preset aspiration position, and discharges the aspirated sample into a reaction vessel 26 transferred to a preset discharge position. The sample dispensing probe 7 is washed by the sample dispensing probe wash system 31 (normal washing).

The sample bar code reader 10 reads the sample ID from the bar code attached to a side face of the sample container 21 accommodated on the sample turntable 2. The bar code is an encoded sample ID that is the identification information of the sample. The identification information read by the sample bar code reader 10 is sent to the controller 40. This way, the controller 40 can manage the samples held in the sample containers 21 and dispensed to the reaction vessels 26 by the sample dispensing probe 7.

The first reagent dispensing probe 12 aspirates a predetermined volume of first reagent from a first reagent container 24 transferred to a preset aspiration position, and discharges the aspirated first reagent into a reaction vessel 26 transferred to a preset discharge position. The first reagent dispensing probe 12 is washed by the first reagent dispensing probe wash system 33 (normal washing).

The second reagent dispensing probe 13 aspirates a predetermined volume of second reagent from a second reagent container 25 transferred to a preset aspiration position, and discharges the aspirated second reagent into a reaction vessel 26 transferred to a preset discharge position. The second reagent dispensing probe 13 is washed by the second reagent dispensing probe wash system 34 (normal washing).

The first reaction liquid stirring system 14 inserts a stirring rod (first stirring rod) that is not shown into the reaction vessel 26 to stir the liquid mixture of the sample and first reagent in the reaction vessel 26. The second reaction liquid stirring system 15 inserts a stirring rod (second stirring rod) that is not shown into the reaction vessel 26 to stir the liquid mixture of the sample, first reagent, and second reagent in the reaction vessel 26. The reaction vessel wash system 18 washes the interior of the reaction vessel 26 that has gone through an analysis process.

The multiwave photometer 16 carries out optical analysis (colorimetric analysis) on the liquid mixture in which the sample has reacted with the first reagent and second reagent, using a light source lamp that emits a light beam toward the reaction vessel 26. The multiwave photometer 16 outputs absorbance indicative of the amount of various constituents in the sample for detection of the reaction state of the sample. The analysis data of the sample obtained by the multiwave photometer 16 is sent to the controller 40. The constant temperature bath 17 maintains the temperature of the reaction vessels 26 accommodated on the reaction turntable 6 consistently at a constant level.

Figure 2:
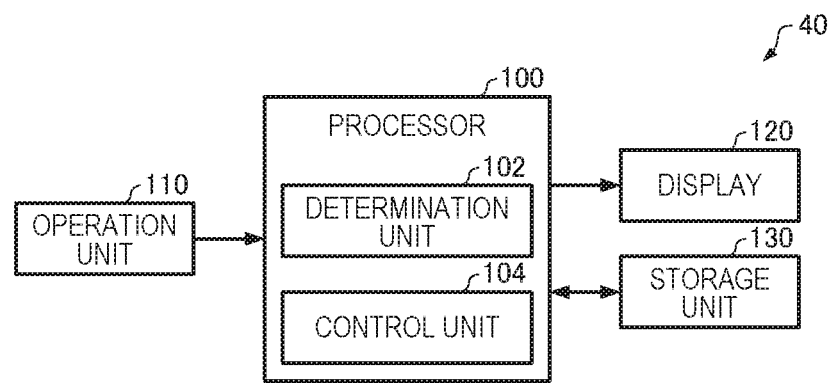
FIG. 2 is a block diagram illustrating one example of the configuration of a controller.

FIG. 2 is a block diagram illustrating one example of the configuration of the controller 40. The controller 40 includes a processor 100, an operation unit 110, a display 120, and a storage unit 130.

The operation unit 110 allows a user to input operation information, and outputs the input operation information to the processor 100. The operation unit 110 can have its functions implemented by input equipment such as a keyboard, mouse, button, touchscreen, touch pad, and so on.

The display 120 outputs images generated by the processor 100 and its functions can be implemented by a touchscreen that also serves as the operation unit 110, an LCD, CRT, and so on.

The storage unit 130 stores programs and various datasets for allowing various units of the processor 100 to function as a computer, and serves the function as a work area of the processor 100, which can be implemented by a hard disk, RAM, and so on. The storage unit 130 stores special washing information including conditions for performing special washing to avoid sample carryover, and washing methods.

The processor 100 performs processing for controlling the drive systems of various components making up the automated analyzer 1, processing for displaying user interface screens or the like on the display 120, and processing for acquiring analysis data of samples, and so on. The functions of the processor 100 can be implemented by executing programs in various processor units or central processing units (CPUs). The processor 100 includes a determination unit 102 and a controller 104.

The determination unit 102 determines whether or not special washing is required based on the information of the sample dispensed by the sample dispensing probe 7 (identification information read by the sample bar code reader 10) and the special washing information stored in the storage unit 130.

The controller 104 controls the operations of the sample dispensing probe 7, first reagent dispensing probe 12, second reagent dispensing probe 13, first reaction liquid stirring system 14 (first stirring rod), second reaction liquid stirring system 15 (second stirring rod), and so on. In a normal measurement operation, the controller 104 causes the first reagent dispensing probe 12 to dispense a first reagent corresponding to a target analyte into a reaction vessel 26, causes the sample dispensing probe 7 to dispense a sample into the reaction vessel 26 holding the dispensed first reagent, causes the first stirring rod to stir the sample and first reagent in the reaction vessel 26, causes the second reagent dispensing probe 13 to dispense a second reagent corresponding to the target analyte into the reaction vessel 26 holding the dispensed first reagent and sample, causes the second stirring rod to stir the sample, first reagent, and second reagent in the reaction vessel 26. To perform special washing, the controller 104 causes the first reagent dispensing probe 12 to dispense a wash liquid selected based on the special washing information into a reaction vessel 26, causes the sample dispensing probe 7 to aspirate some of the wash liquid in the reaction vessel 26 and to discharge the aspirated wash liquid into a wash chamber (wash port) of the sample dispensing probe wash system 31, causes the first stirring rod to stir the wash liquid in the reaction vessel 26, causes the second reagent dispensing probe 13 to additionally dispense the wash liquid selected based on the special washing information into the reaction vessel 26, and causes the second stirring rod to stir the wash liquid in the reaction vessel 26. When performing special washing, the controller 104 thus causes the analyzer to handle the wash liquid selected based on the special washing information as a reagent corresponding to a target analyte in a normal measurement operation, and to operate as if assaying a sample (wash liquid) for detecting a target analyte (which is referred to as a wash option, for example, in the special washing). For the special washing, the controller 104 causes the first reagent dispensing probe 12, second reagent dispensing probe 13, first reaction liquid stirring system 14, and second reaction liquid stirring system 15 to operate similarly to the normal measurement operation. Only the sample dispensing probe 7 is caused to move differently from the normal measurement operation.

The user can set conditions for special washing and washing methods in the user interface screen shown on the display 120. The contents of the setting are stored as special washing information in the storage unit 130. When sample carryover is to be avoided for all the samples, the user selects "continuous wash mode" as an operation mode of special washing. When carryover of a specified target analyte (biochemical analyte) is to be avoided, the user selects "analyte-specific wash mode" as an operation mode of special washing.

Figure 3:
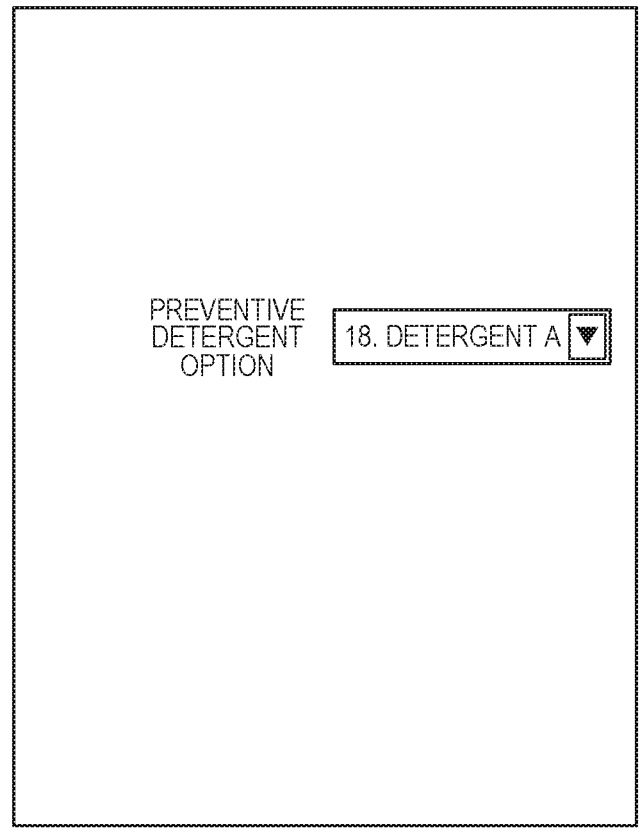
FIG. 3 is a diagram illustrating a carryover analyte setting screen displayed when continuous wash mode is selected.

FIG. 3 is a diagram illustrating a carryover analyte setting screen displayed when continuous wash mode is selected. Selecting a desired one from a preset list of wash options and setting it as "preventive detergent option" allows the user to set a washing method in the continuous wash mode. In this example, "18. Detergent A" is selected as a wash option and set as "preventive detergent option". The wash options are handled as analysis conditions in the same way as biochemical analytes are. Various types of wash liquids, dispensing volumes, positions of detergent bottles, etc., are preset as wash options. In continuous wash mode, the special washing is performed in accordance with the wash option set as "preventive detergent option" immediately before the assay of all the samples.

FIG. 4 is a diagram illustrating a carryover analyte setting screen displayed when analyte-specific wash mode is selected. This screen allows the user to select a wash option for each biochemical analyte set as "carryover analyte" and to set it as "preventive detergent option". In this example, "18. Detergent A" is selected and set as "preventive detergent option" for the biochemical analyte "1. HCV", and "19. Detergent B" is selected and set as "preventive detergent option" for the biochemical analyte "2. Syphilis TP" and "3. Syphilis RP". Therefore, in this case, the special washing is performed in accordance with the selected wash option, i.e., using the "18. Detergent A" immediately before the assay of samples to be tested for the biochemical analyte "1. HCV", and the special washing is performed in accordance with the selected wash option, i.e., using the "19. Detergent B" immediately before the assay of samples to be tested for the biochemical analytes "2. Syphilis TP" and "3. Syphilis RP".

If the samples are to be assayed in the order of sample "A"→sample "B"→sample "C" . . . and so on, the special washing is carried out before dispensing every and each sample in continuous wash mode, whereas the special washing is carried out immediately before dispensing a sample to be tested for the biochemical analyte set as the carryover analyte in analyte-specific wash mode. For example, if special washing is to be performed immediately before the assay of sample "B", a step of special washing is automatically inserted as an assay of another sample "X" before the assay of sample "B", i.e., sample "A"→sample "X" (wash option)→sample "B" . . . , and so on. Namely, the wash option set as "preventive detergent option" is handled as a target analyte, so that sample "X" is assayed, as if to detect the target analyte, which in this case is the detergent set as the wash option, before the assay of sample "B". When "analyte-specific wash mode" is selected as the operation mode of special washing, the operation simulating an assay for the wash option of the special washing is performed not immediately before the assays for the detection of the target analyte preset as "carryover analyte", but immediately before the assay of a sample to be tested for the target analyte specified as "carryover analyte". This allows for reliable avoidance of sample carryover influence even in control procedures in which the order of assays for detecting target analytes is changed for the same sample, as in the following cases (1) to (3). (1) When the order of dispensing reagents (order of assays for detecting target analytes) is changed to avoid a predetermined combination of types of reagents being dispensed one after another, so as to prevent the reagents from contaminating each other. (2) When assays for detecting target analytes that require longer time are prioritized. (3) When the same sample is tested for a biochemical analyte and an electrolytic analyte and when the assay for detecting the electrolytic analyte is prioritized over the biochemical analyte.

Figure 5:
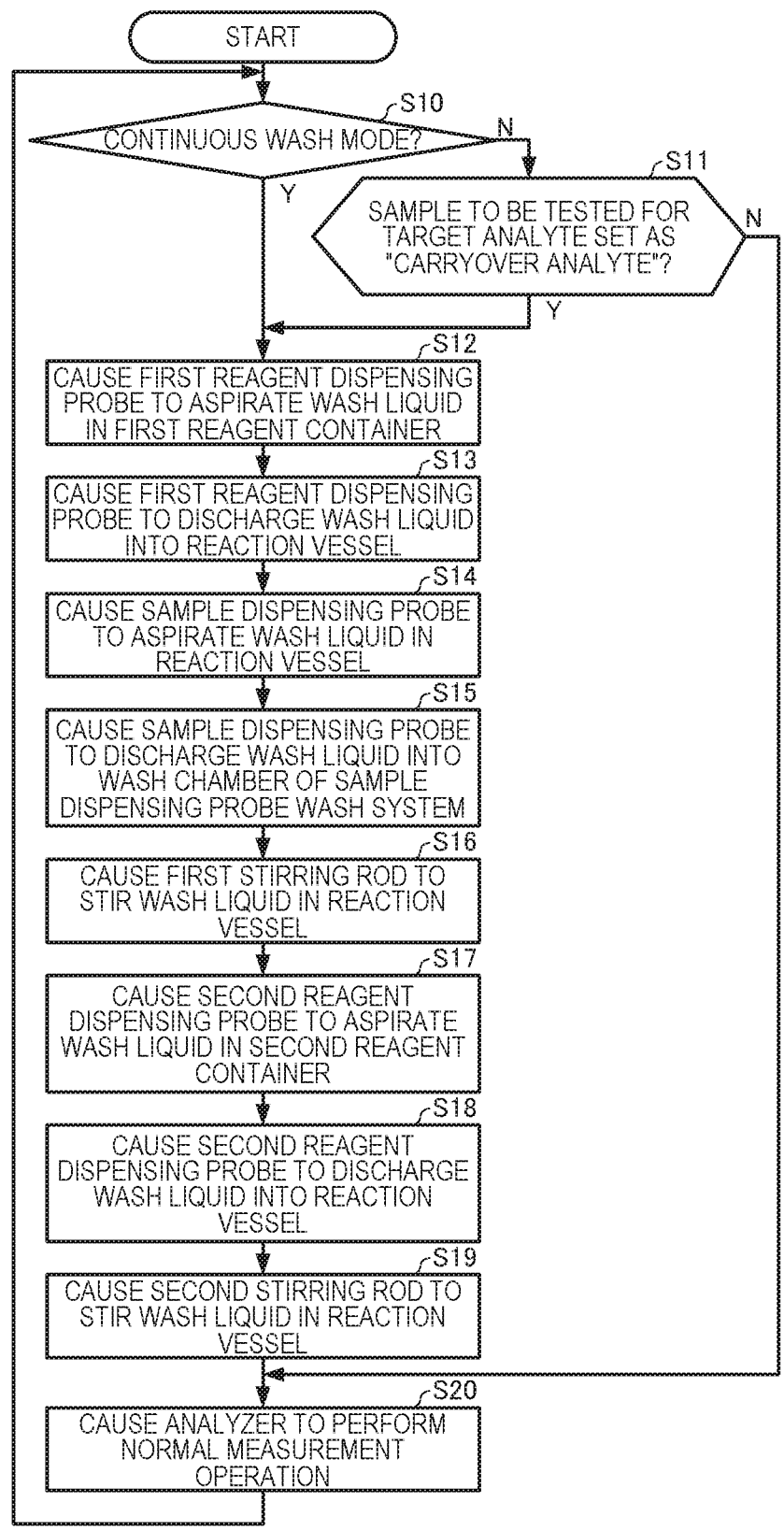
FIG. 5 is a flowchart illustrating a flow of processing in the automated analyzer according to the first embodiment.

FIG. 5 is a flowchart illustrating the flow of processing in the automated analyzer according to the first embodiment.

First, the determination unit 102 determines whether or not "continuous wash mode" is selected as the operation mode of special washing based on the information of the sample dispensed by the sample dispensing probe 7 and the special washing information stored in the storage unit 130 (step S10). If "analyte-specific wash mode" has been selected as the operation mode of special washing (N at step S10), the determination unit 102 determines whether or not the sample to be dispensed is a sample to be tested for a target analyte set as "carryover analyte" (step S11). If the sample to be dispensed is not a sample to be tested for a target analyte set as "carryover analyte" (N at step S11), the process goes to step S20.

If "continuous wash mode" has been selected as the operation mode of special washing (Y at step S10), and if the sample to be dispensed is a sample to be tested for a target analyte set as "carryover analyte" (Y at step S11), the controller 104 controls the drive systems of various components of the automated analyzer 1 to perform the following special washing based on the special washing information. In special washing, first, the controller 104 causes the first reagent dispensing probe 12 to aspirate a wash liquid in a first reagent container 24 (wash liquid, or the wash option set as "preventive detergent option") (step S12), and to discharge the wash liquid into a reaction vessel 26 (step S13). Next, the controller 104 causes the sample dispensing probe 7 to aspirate the wash liquid in the reaction vessel 26 that has been dispensed at step S13 (step S14), and to discharge the wash liquid into a wash chamber of the sample dispensing probe wash system 31 (step S15). At step S14, the controller 104 may determine the descending amount of the sample dispensing probe 7 relative to the reaction vessel 26 when the sample dispensing probe 7 aspirates the wash liquid in the reaction vessel 26, based on the volume of wash liquid that has been dispensed into the reaction vessel 26 at step S13 (liquid level of the wash liquid in the reaction vessel 26). In this case, the controller 104 controls the sample dispensing probe 7 such that the larger the volume of dispensed wash liquid (higher the liquid level of the wash liquid), the smaller the descending amount of the sample dispensing probe 7. The liquid level of the wash liquid can be calculated from the volume of dispensed wash liquid and the cross-sectional area of the reaction vessel 26. Next, the controller 104 causes the stirring rod (first stirring rod) of the first reaction liquid stirring system 14 to stir the wash liquid in the reaction vessel 26 containing the liquid dispensed at step S13 (step S16). Next, the controller 104 causes the second reagent dispensing probe 13 to aspirate a wash liquid in a second reagent container 25 (wash liquid, or the wash option set as "preventive detergent option") (step S17), and to additionally discharge the wash liquid into the reaction vessel 26 containing the liquid dispensed at step S13 (step S18). Next, the controller 104 causes the stirring rod (second stirring rod) of the second reaction liquid stirring system 15 to stir the wash liquid in the reaction vessel 26 containing the liquid dispensed at steps S13 and S18 (step S19), and ends the special washing.

Next, the controller 104 controls the drive systems of various components of the automated analyzer 1 to perform the normal measurement operation (dispensing the samples, dispensing the reagents, stirring the mixture liquids, and performing colorimetric assays) (step S20), after which the process goes to step S10.

According to the automated analyzer of the first embodiment, special washing of the interior and exterior of the first reagent dispensing probe 12 and second reagent dispensing probe 13 can be performed by causing the first reagent dispensing probe 12 and second reagent dispensing probe 13 to aspirate wash liquids in the first reagent container 24 and second reagent container 25, respectively, and to discharge the wash liquids into the reaction vessel 26, and special washing of the first stirring rod and second stirring rod can be performed by causing the first stirring rod and second stirring rod to stir the wash liquids in the reaction vessel 26, so that sample carryover via the reagent dispensing probes or stirring rods can be prevented. Since the wash liquid is dispensed to the reaction vessel 26 by the first reagent dispensing probe 12 and special washing of the sample dispensing probe 7 is performed using this wash liquid, the sample dispensing probe 7 does not contact the fluid in the wash liquid sources (wash liquids contained in the first reagent container 24 and second reagent container 25), so that the fluids in the wash liquid sources are prevented from being contaminated. Since the second stirring rod stirs the wash liquid additionally dispensed by the second reagent dispensing probe 13, special washing of the second stirring rod can be carried out with purer wash liquid, as compared to a case where the second stirring rod stirs the wash liquid in the reaction vessel 26 after the special washing of the first stirring rod. The descending amount of the sample dispensing probe 7 relative to the reaction vessel 26 may be determined based on the volume of wash liquid dispensed to the reaction vessel 26 such as to limit the extent to which the sample dispensing probe 7 is immersed in the wash liquid, to prevent residual wash liquid on the exterior of the sample dispensing probe 7 from being carried over to the subsequently dispensed sample.

2. Second Embodiment

Figure 6:
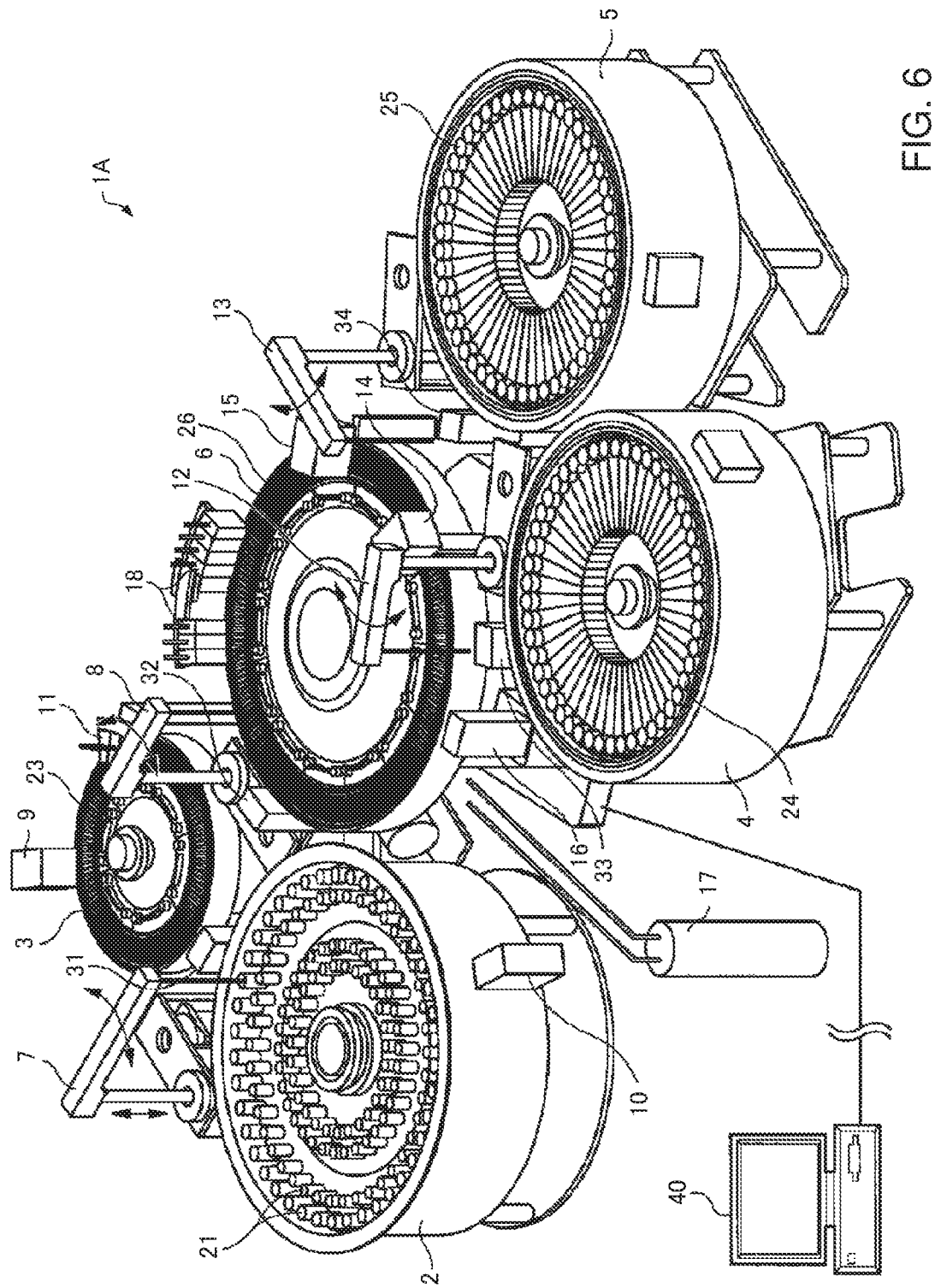
FIG. 6 is a schematic diagram illustrating one example of the configuration of an automated analyzer according to the second embodiment.

FIG. 6 is a schematic diagram illustrating one example of the configuration of an automated analyzer according to a second embodiment. In FIG. 6, configurations similar to those of FIG. 1 are given the same reference numerals and description thereof is omitted where possible.

The automated analyzer 1A illustrated in FIG. 6 is configured to include, in addition to the components of the automated analyzer 1 illustrated in FIG. 1, a dilution turntable 3, a diluted sample dispensing probe 8, a dilution and stir system 9, a dilution vessel wash system 11, and a diluted sample dispensing probe wash system 32. Some of the sample containers 21 contain a wash liquid to be used for special washing.

The dilution turntable 3 holds a plurality of dilution vessels 23. The dilution vessels 23 hold diluted samples, i.e., the samples that have been aspirated from the sample containers 21 and diluted.

The sample dispensing probe 7 (original sample dispensing probe) aspirates a predetermined volume of sample (original sample) from a sample container 21 transferred to a preset aspiration position, and discharges the aspirated sample and a predetermined volume of diluent (e.g., physiological saline) supplied from the sample dispensing probe 7 itself into a dilution vessel 23 transferred to a preset discharge position.

The diluted sample dispensing probe 8 aspirates a predetermined volume of diluted sample from a dilution vessel 23 transferred to a preset aspiration position, and discharges the aspirated diluted sample into a reaction vessel 26 transferred to a preset discharge position. The diluted sample dispensing probe 8 is washed by the diluted sample dispensing probe wash system 32 (normal washing). The dilution and stir system 9 inserts a diluting/stirring rod (not shown) into the dilution vessel 23 to stir the sample and diluent in the dilution vessel 23. The dilution vessel wash system 11 washes the interior of the dilution vessel 23. Other configurations are similar to those of the automated analyzer according to the first embodiment.

In a normal measurement operation, the controller 104 of the controller 40 causes the sample dispensing probe 7 to dispense a sample and diluent into a dilution vessel 23, causes the diluting/stirring rod to stir the sample and diluent, causes the first reagent dispensing probe 12 to dispense a first reagent corresponding to a target analyte into a reaction vessel 26, causes the diluted sample dispensing probe 8 to dispense a diluted sample into the reaction vessel 26 holding the dispensed first reagent, causes the first stirring rod to stir the diluted sample and first reagent in the reaction vessel 26, causes the second reagent dispensing probe 13 to dispense a second reagent corresponding to the target analyte into the reaction vessel 26 holding the dispensed first reagent and diluted sample, causes the second stirring rod to stir the diluted sample, first reagent, and second reagent in the reaction vessel 26. To perform special washing of the sample dispensing probe 7, diluted sample dispensing probe 8, and diluting/stirring rod, the controller 104 causes the sample dispensing probe 7 to dispense a wash liquid (a wash liquid contained in a part of the sample container 21) selected based on the special washing information into a dilution vessel 23, causes the diluting/stirring rod to stir the wash liquid in the dilution vessel 23, causes the diluted sample dispensing probe 8 to aspirate the wash liquid in the dilution vessel 23 and to discharge the aspirated wash liquid into a wash chamber of the diluted sample dispensing probe wash system 32. To perform special washing of the first reagent dispensing probe 12, second reagent dispensing probe 13, first stirring rod, and second stirring rod, the controller 104 causes the first reagent dispensing probe 12 to dispense a wash liquid selected based on the special washing information into a reaction vessel 26, causes the first stirring rod to stir the wash liquid in the reaction vessel 26, causes the second reagent dispensing probe 13 to additionally dispense the wash liquid selected based on the special washing information into the reaction vessel 26, and causes the second stirring rod to stir the wash liquid in the reaction vessel 26. When performing special washing, the controller 104 thus causes the analyzer to handle the wash liquid selected based on the special washing information as a sample and a reagent corresponding to a target analyte in a normal measurement operation, and to operate as if assaying a sample (wash liquid) for detecting a target analyte (which is referred to as a wash option, for example, in the special washing). For the special washing, the controller 104 causes the sample dispensing probe 7, first reagent dispensing probe 12, second reagent dispensing probe 13, dilution and stir system 9, first reaction liquid stirring system 14, and second reaction liquid stirring system 15 to operate similarly to the normal measurement operation. Only the diluted sample dispensing probe 8 is caused to move differently from the normal measurement operation.

Figure 7:
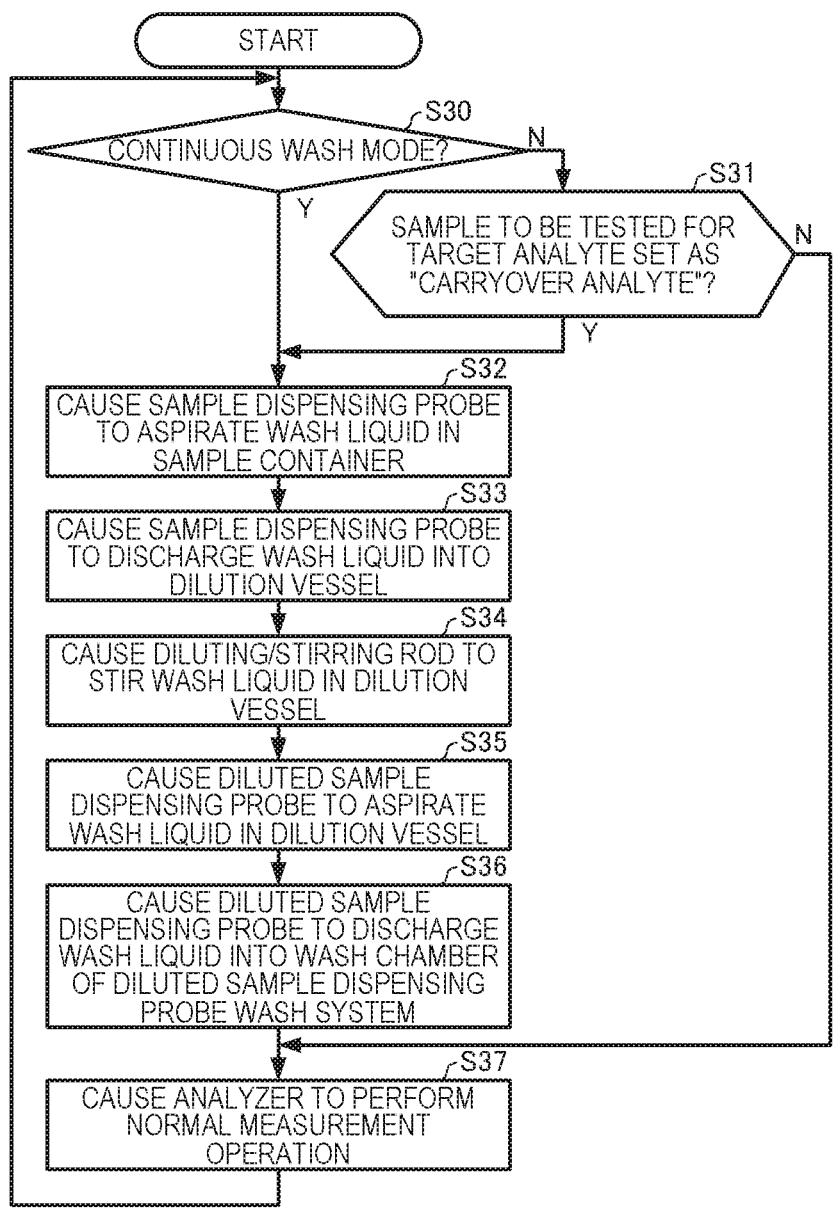
FIG. 7 is a flowchart illustrating a flow of processing in the automated analyzer according to the second embodiment.
Figure 8:
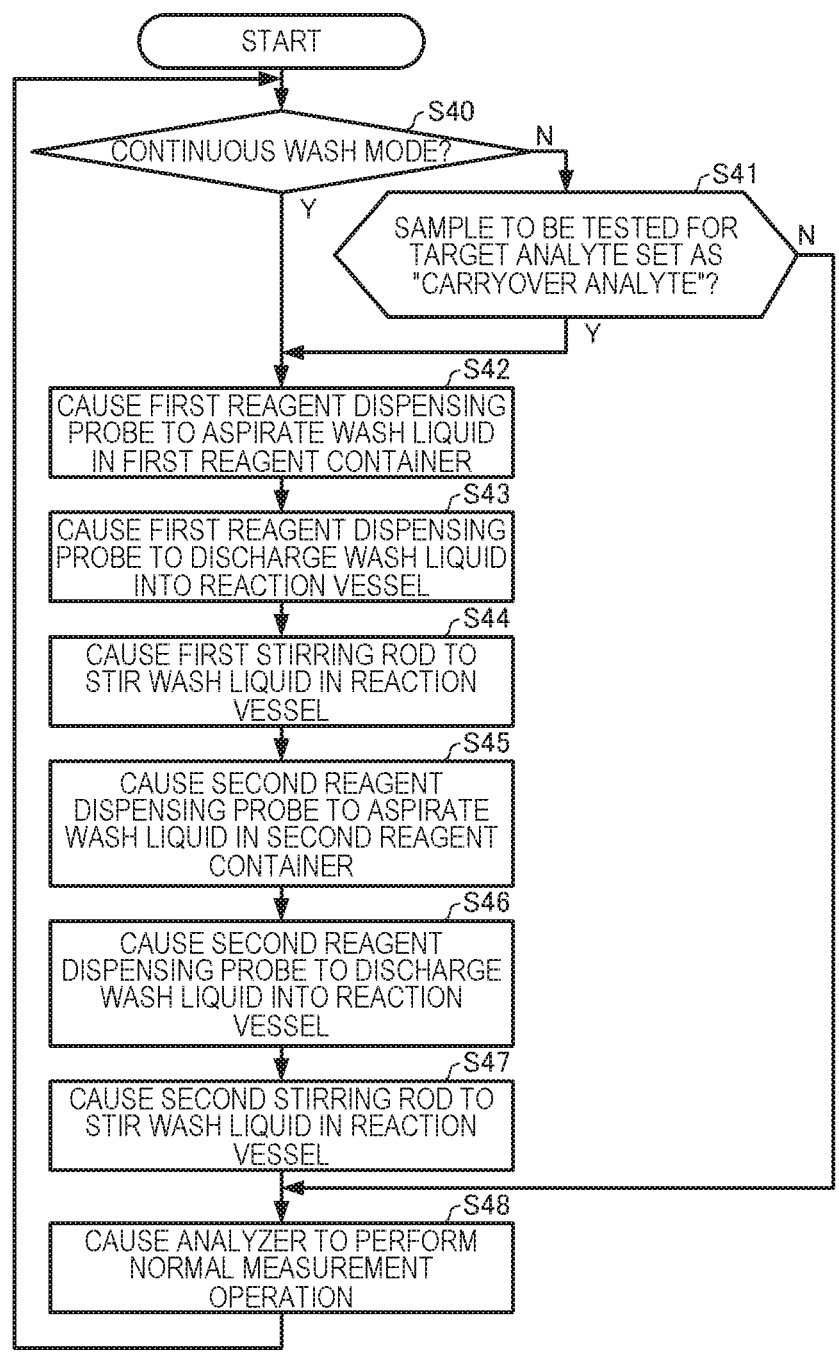
FIG. 8 is a flowchart illustrating a flow of processing in the automated analyzer according to the second embodiment.

FIG. 7 and FIG. 8 are flowcharts illustrating the flow of processing in the automated analyzer according to the second embodiment. First, the special washing of the sample dispensing probe 7, diluted sample dispensing probe 8, and diluting/stirring rod will be described with reference to FIG. 7.

First, the determination unit 102 determines whether or not "continuous wash mode" is selected as the operation mode of special washing based on the information of the sample dispensed by the sample dispensing probe 7 and diluted sample dispensing probe 8 and the special washing information stored in the storage unit 130 (step S30). If "analyte-specific wash mode" has been selected as the operation mode of special washing (N at step S30), the determination unit 102 determines whether or not the sample to be dispensed is a sample to be tested for a target analyte set as "carryover analyte" (step S31). If the sample to be dispensed is not a sample to be tested for a target analyte set as "carryover analyte" (N at step S31), the process goes to step S37.

If "continuous wash mode" has been selected as the operation mode of special washing (Y at step S30), and if the sample to be dispensed is a sample to be tested for a target analyte set as "carryover analyte" (Y at step S31), the controller 104 controls the drive systems of various components of the automated analyzer 1A to perform the following special washing. In special washing of the sample dispensing probe 7, diluted sample dispensing probe 8, and diluting/stirring rod, first, the controller 104 causes the sample dispensing probe 7 to aspirate a wash liquid in a sample container 21 (wash liquid, or the wash option set as "preventive detergent option") (step S32), and to discharge the wash liquid into a dilution vessel 23 (step S33). Next, the controller 104 causes the diluting/stirring rod of the dilution and stir system 9 to stir the wash liquid in the dilution vessel 23 containing the liquid dispensed at step S33 (step S34). Next, the controller 104 causes the diluted sample dispensing probe 8 to aspirate the wash liquid in the dilution vessel 23 (step S35), and to discharge the wash liquid into a wash chamber of the diluted sample dispensing probe wash system 32 (step S36), and ends the special washing.

Next, the controller 104 controls the drive systems of various components of the automated analyzer 1A to perform the normal measurement operation (dispensing the samples and diluent, stirring the samples and diluent, dispensing the diluted samples, dispensing the reagents, stirring the mixture liquids, and performing colorimetric assays) (step S37), after which the process goes to step S30.

Next, the special washing of the first reagent dispensing probe 12, second reagent dispensing probe 13, first stirring rod, and second stirring rod will be described with reference to FIG. 8.

First, the determination unit 102 determines whether or not "continuous wash mode" is selected as the operation mode of special washing based on the information of the sample dispensed by the sample dispensing probe 7 and diluted sample dispensing probe 8 and the special washing information stored in the storage unit 130 (step S40). If "analyte-specific wash mode" has been selected as the operation mode of special washing (N at step S40), the determination unit 102 determines whether or not the sample to be dispensed is a sample to be tested for a target analyte set as "carryover analyte" (step S41). If the sample to be dispensed is not a sample to be tested for a target analyte set as "carryover analyte" (N at step S41), the process goes to step S48.

If "continuous wash mode" has been selected as the operation mode of special washing (Y at step S40), and if the sample to be dispensed is a sample to be tested for a target analyte set as "carryover analyte" (Y at step S41), the controller 104 controls the drive systems of various components of the automated analyzer 1A to perform the following special washing. In special washing of the first reagent dispensing probe 12, second reagent dispensing probe 13, first stirring rod, and second stirring rod, first, the controller 104 causes the first reagent dispensing probe 12 to aspirate a wash liquid in a first reagent container 24 (wash liquid, or the wash option set as "preventive detergent option") (step S42), and to discharge the wash liquid into a reaction vessel 26 (step S43). Next, the controller 104 causes the stirring rod (first stirring rod) of the first reaction liquid stirring system 14 to stir the wash liquid in the reaction vessel 26 containing the liquid dispensed at step S43 (step S44). Next, the controller 104 causes the second reagent dispensing probe 13 to aspirate a wash liquid in a second reagent container 25 (wash liquid, or the wash option set as "preventive detergent option") (step S45), and to additionally discharge the wash liquid into the reaction vessel 26 containing the liquid dispensed at step S43 (step S46). Next, the controller 104 causes the stirring rod (second stirring rod) of the second reaction liquid stirring system 15 to stir the wash liquid in the reaction vessel 26 containing the liquid dispensed at steps S43 and S46 (step S47), and ends the special washing.

Next, the controller 104 controls the drive systems of various components of the automated analyzer 1A to perform the normal measurement operation (dispensing the samples and diluent, stirring the samples and diluent, dispensing the diluted samples, dispensing the reagents, stirring the mixture liquids, and performing colorimetric assays) (step S48), after which the process goes to step S40.

The second embodiment provides the similar effects as those of the first embodiment, i.e., sample carryover via the reagent dispensing probes and stirring rods can be prevented.

While the first reagent dispensing probe 12 and second reagent dispensing probe 13 are caused to aspirate wash liquids in the first reagent container 24 and second reagent container 25, respectively, in the embodiment described above, the first reagent dispensing probe 12 and second reagent dispensing probe 13 may be caused to aspirate wash liquids in dedicated wash liquid containers or wash liquid supply ports disposed at predetermined positions. While special washing of the diluted sample dispensing probe 8 is carried out by causing the diluted sample dispensing probe 8 to aspirate the wash liquid that has been dispensed to the dilution vessel 23 by the sample dispensing probe 7 in the second embodiment described above, the special washing of the diluted sample dispensing probe 8 may be carried out by causing the diluted sample dispensing probe 8 to aspirate the wash liquid that has been dispensed to the reaction vessel 26 by the first reagent dispensing probe 12, as with the first embodiment.

The influence of carryover of a sample (contaminant sample) with a concentration of a substance for which 1:524,288 (19th power of 2) dilution still gives a positive result on the samples analyzed next and onwards (next samples) was compared between an existing method (in which no special washing is performed for the reagent dispensing probes and first and second stirring rods) and the method of the embodiment described above. In the method of the embodiment, a solution containing from 0.45 to 0.55 mol/l (about 2%) sodium hydroxide and less than 1.0% anionic surfactant was used as the wash liquid. Table 1 shows the results of comparison by measurement values (cutoff index (COI) values).

TABLE 1

|  | Next Sample | Contaminant Sample 1 | Contaminant Sample 2 |
|---|---|---|---|
| Existing Method | 1st (immediate next) | 1.23 | 2.84 |
|  | 2nd | 0.13 | 0.17 |
|  | 3rd | 0.09 | 0.15 |
|  | 4th | 0.11 | 0.08 |
|  | 5th | 0.09 | 0.07 |
| Method of the Embodiment | 1st (immediate next) | 0.00 | 0.02 |
|  | 2nd | −0.04 | −0.03 |
|  | 3rd | 0.05 | −0.03 |
|  | 4th | −0.04 | −0.05 |
|  | 5th | −0.06 | 0.02 |

While the COI value of the next sample assayed by the existing method immediately after the contaminant sample exceeded 1.0, the COI value of the next sample was less than 1.0 in every case assayed by the method of this embodiment, i.e., no carryover influence was observed.

The invention is not limited to the embodiments described above and various modifications are possible. The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. An automated analyzer comprising:
    a reagent dispensing probe that dispenses a reagent of a plurality of reagents to a reaction vessel, wherein the plurality of reagents comprise a wash liquid;
    a sample dispensing probe that dispenses a sample to the reaction vessel;
    a stiffing rod that stirs the sample and the reagent in the reaction vessel;
    a storage unit that stores washing information, wherein the washing information is set by a user, and wherein the washing information includes a condition for performing a special washing to prevent sample carryover and a washing method;
    a determination unit that determines whether performing the special washing is required based on information about the sample dispensed by the sample dispensing probe and the special washing information set by the user, wherein the condition for performing the special washing, set by the user, includes a target analyte; and
    a controller that controls operations of the reagent dispensing probe, the sample dispensing probe, and the stiffing rod,
    wherein, when performing the special washing, the controller causes the reagent dispensing probe to dispense the wash liquid to the reaction vessel and causes the stiffing rod to stir the wash liquid in the reaction vessel based on the washing information,
    wherein the reagent dispensing probe is a first reagent dispensing probe that dispenses a first reagent or a first wash liquid to the reaction vessel,
    wherein the automated analyzer further comprises a second reagent dispensing probe that dispenses a second reagent or a second wash liquid to the reaction vessel,
    wherein the stirring rod is a first stirring rod that stirs the sample and the first reagent in the reaction vessel,
    wherein the automated analyzer further comprises a second stirring rod that stirs the sample, the first reagent, and the second reagent in the reaction vessel, and
    wherein, when performing the special washing, the controller causes the first stirring rod to stir the first wash liquid dispensed to the reaction vessel by the first reagent dispensing probe, and causes the second stiffing rod to stir the second wash liquid additionally dispensed to the reaction vessel by the second reagent dispensing probe.

2. The automated analyzer according to claim 1, wherein the automated analyzer further comprises a sample dispensing probe wash system, and wherein the controller causes the sample dispensing probe to aspirate the wash liquid in the reaction vessel and to discharge the aspirated wash liquid into a wash chamber of the sample dispensing probe wash system.

3. The automated analyzer according to claim 2, wherein based on determining a volume of the wash liquid dispensed to the reaction vessel, the controller controls a descending amount of the sample dispensing probe relative to the reaction vessel when the sample dispensing probe aspirates the wash liquid in the reaction vessel.

4. A method of controlling an automated analyzer that comprises a first reagent dispensing probe that dispenses a first reagent or a first wash liquid of a plurality of reagents or wash liquids to a reaction vessel, a second reagent dispensing probe that dispenses a second reagent or a second wash liquid to the reaction vessel, a sample dispensing probe that dispenses a sample to the reaction vessel, a first stiffing rod that stirs the sample and the first reagent in the reaction vessel, a second stiffing rod that stirs the sample, the first reagent, and the second reagent in the reaction vessel, and a storage unit that stores washing information, wherein the washing information is set by a user, and wherein the washing information includes a condition for performing a special washing to prevent sample carryover and a washing method, the method comprising:
- a determination step of determining whether the special washing is required based on information about the sample dispensed by the sample dispensing probe and the special washing information set by the user, wherein the condition for performing the special washing, set by the user, includes a target analyte; and
- a control step of controlling operations of the first reagent dispensing probe, the second reagent dispensing probe, the sample dispensing probe, the first stiffing rod, and the second stirring rod,
- wherein, when performing the special washing, the control step includes causing the first stiffing rod to stir the first wash liquid dispensed to the reaction vessel by the first reagent dispensing probe, and causing the second stirring rod to stir the second wash liquid additionally dispensed to the reaction vessel by the second reagent dispensing probe based on the washing information.

5. The automated analyzer according to claim 1,
wherein the determination unit determines whether or not the sample dispensed by the sample dispensing probe is a sample to be tested for the target analyte set by the user as the condition for performing the special washing;
wherein when the sample dispensed by the sample dispensing probe is not a sample to be tested for the target analyte set by the user as the condition for performing the special washing, the determination unit determines that performance of the special washing is not necessary, and the controller causes a normal measurement operation to be performed; and
wherein when the sample dispensed by the sample dispensing probe is a sample to be tested for the target analyte set by the user as the condition for performing the special washing, the determination unit determines that performance of the special washing is necessary, and the controller, before an assay of the sample to be tested for the target analyte, causes the sample dispensing probe to dispense the wash liquid to the reaction vessel, and causes the stiffing rod to stir the wash liquid in the reaction vessel, based on the special washing information.

6. The automated analyzer according to claim 1, wherein
the automated analyzer comprises a first turn table that holds a first reagent container which contains the first reagent or the first wash liquid, and a second turn table that holds a second reagent container which contains the second reagent or the second wash liquid;
wherein the first reagent dispensing probe is configured to dispense the first reagent or the first wash liquid contained in the first reagent container held in the first turn table to the reaction vessel transferred to a first discharge position;
wherein the second reagent dispensing probe is configured to dispense the second reagent or the second wash liquid contained in the second container held in the second turn table to the reaction vessel transferred to a second discharge position;
wherein the first stiffing rod is configured to stir the sample and the first reagent in the reaction vessel transferred to a first stiffing position;
wherein the second stiffing rod is configured to stir the sample, the first reagent and the second reagent in the reaction vessel transferred to a second stirring position; and
wherein, when performing the special washing, the controller causes the first stirring rod to stir, at the first stirring position, the first wash liquid dispensed to the reaction vessel at the first discharge position by the first reagent dispensing probe, and causes the second stiffing rod to stir, at the second stirring position, the second wash liquid additionally dispensed to the reaction vessel at the second discharged position by the second reagent dispensing probe.

* * * * *